(12) United States Patent
Mukker et al.

(10) Patent No.: US 12,147,286 B2
(45) Date of Patent: Nov. 19, 2024

(54) POWER AND THERMAL MANAGEMENT IN A SOLID STATE DRIVE

(71) Applicant: Intel Corporation, Santa Clara, CA (US)

(72) Inventors: Anoop Mukker, Folsom, CA (US); Romesh Trivedi, Folsom, CA (US); Suresh Nagarajan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 734 days.

(21) Appl. No.: 17/129,116

(22) Filed: Dec. 21, 2020

(65) Prior Publication Data

US 2021/0109587 A1    Apr. 15, 2021

(51) Int. Cl.
*G06F 1/32* (2019.01)
*G06F 1/20* (2006.01)
*G06F 1/3221* (2019.01)
*G06F 1/3234* (2019.01)

(52) U.S. Cl.
CPC ............ *G06F 1/3268* (2013.01); *G06F 1/206* (2013.01); *G06F 1/3221* (2013.01)

(58) Field of Classification Search
None
See application file for complete search history.

(56) References Cited

U.S. PATENT DOCUMENTS

| | | | |
|---|---|---|---|
| 9,417,684 B2 | 8/2016 | Ramage et al. | |
| 2011/0047316 A1* | 2/2011 | Farhan | G06F 1/3275 713/320 |
| 2013/0275781 A1* | 10/2013 | Ramage | G06F 1/3275 713/300 |
| 2018/0181322 A1* | 6/2018 | Khan | G06F 3/0679 |
| 2018/0335978 A1* | 11/2018 | Tidwell | G06F 1/28 |
| 2019/0065086 A1* | 2/2019 | Margetts | G06F 13/1668 |

* cited by examiner

*Primary Examiner* — Fahmida Rahman
(74) *Attorney, Agent, or Firm* — Compass IP Law PC (57) ABSTRACT

Power management circuitry in the solid state drive monitors activity on the plurality of media channels to coordinate an active period and an idle period using credits to manage a power budget for the solid state drive. The power management circuitry to coordinate active and idle periods across components in a workload pipeline in the solid state drive for a given performance target to obtain an optimal power and thermal profile.

17 Claims, 8 Drawing Sheets

POWER AND THERMAL MANAGEMENT IN A SOLID STATE DRIVE

FIELD

This disclosure relates to storage devices and in particular to power and thermal management in a solid state drive.

BACKGROUND

Non-volatile memory refers to memory whose state is determinate even if power is interrupted to the device. Storage devices that include non-volatile memory include a secure digital card, a multimedia card, a flash drive (for example, a Universal Serial Bus (USB) flash drive also known as a "USB thumb drive" or "USB memory stick" that includes non-volatile memory with an integrated USB interface), and a solid state drive.

A solid state drive (SSD) is a storage device that stores data in non-volatile memory. Typically, the solid-state drive includes a block-based memory such as NAND Flash and a controller to manage read/write requests received from a host for data stored in the NAND Flash. Power management is a feature of the solid state drive that switches the solid state drive to a low-power state when inactive.

The solid state drive includes semiconductor dies such as, controllers and non-volatile memory that are susceptible to temporary malfunction or permanent failure if overheated. Thermal management is used in the solid state drive to prevent failure.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined as set forth in the accompanying claims.

DESCRIPTION OF EMBODIMENTS

A host system can communicate with a solid-state drive over a high-speed serial computer expansion bus, for example, a Peripheral Component Interconnect Express (PCIe) bus using a Non-Volatile Memory Express (NVMe) standard protocol. The Non-Volatile Memory Express (NVMe) standard protocol defines a register level interface for host software to communicate with the Solid State Drive (SSD) over the Peripheral Component Interconnect Express (PCIe) bus.

The NVMe standard protocol defines a plurality of power states, for example, 32 power states, for the solid state drive. While in an operational state, the solid state drive performs Input/Output (I/O) operations. While in a non-operational power state the solid state drive does not perform I/O operations. Each power state (operational power state or non-operational power state) has a maximum power consumption. Non-operational states can be used to improve battery life in a solid state drive in a client system, for example, a laptop.

The NVMe architecture includes features to manage the power states of the solid state drive. The host can configure a solid state drive to automatically transition between the power states to meet thermal requirements. Thermal throttling prevents overheating of components in the solid state drive. When the temperature is less than a specified threshold, data transfer speed over the PCIe bus is increased for faster performance. If the temperature is greater than the specified threshold, data transfer speed over the PCIe bus is decreased.

To obtain an optimal power and thermal profile, a mechanism to coordinate active and idle periods across all agents in a workload pipeline for a given performance target is provided. The mechanism provides best performance for a given power and thermal profile.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
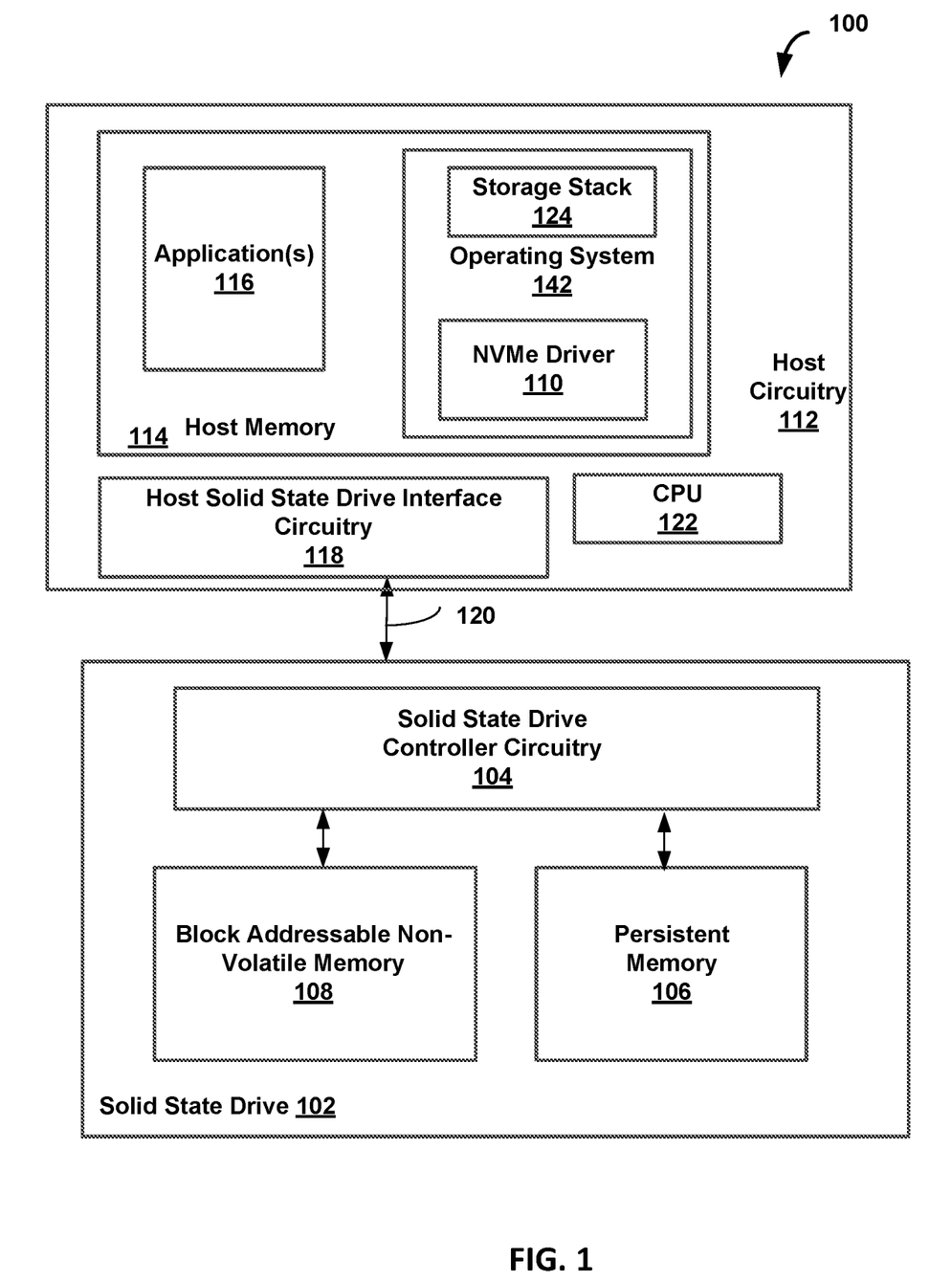
FIG. 1 is a block diagram of a computer system that includes host circuitry communicatively coupled to a solid state drive.

FIG. 1 is a block diagram of a computer system 100 that includes host circuitry 112 communicatively coupled to a solid state drive 102. The host circuitry 112 includes a host memory 114. One or more applications 116 (programs that perform a particular task or set of tasks) and an operating system 142 that includes a storage stack 124 and a host NVMe driver 110 may be stored in host memory 114. The host circuitry 112 also includes a Central Processing Unit (CPU) 122 and host solid state drive interface circuitry 118.

An operating system 142 is software that manages computer hardware and software including memory allocation and access to Input/Output (I/O) devices. Examples of operating systems include Microsoft® Windows®, Linux®, iOS® and Android®. In an embodiment for the Microsoft® Windows® operating system, the storage stack 124 may be a device stack that includes a port/miniport driver for the solid state drive 102.

In an embodiment, the host memory 114 is a volatile memory. Volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4 (LPDDR version 4, JESD209-4, originally published by JEDEC in August 2014), WIO2 (Wide Input/Output version 2, JESD229-2 originally published by JEDEC in August 2014), HBM (High Bandwidth Memory, JESD325, originally published by JEDEC in October 2013), DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

The host solid state drive interface circuitry 118 can communicate with the solid state drive 102 over a high-speed serial computer expansion bus 120, for example, a Peripheral Component Interconnect Express (PCIe) bus. The host solid state drive interface circuitry 118 manages the communication over the Peripheral Component Interconnect Express (PCIe) bus. In an embodiment, the host system communicates over the Peripheral Component Interconnect Express (PCIe) bus using a Non-Volatile Memory Express (NVMe) standard protocol. The Non-Volatile Memory Express (NVMe) standard protocol defines a register level interface for host software to communicate with the Solid State Drive (SSD) 102 over the Peripheral Component Interconnect Express (PCIe) bus. The NVM Express standards are available at www.nvmexpress.org. The PCIe standards are available at pcisig.com.

The solid state drive 102 includes solid state drive controller circuitry 104, a persistent memory 106 and a block addressable non-volatile memory 108. A request to read data stored in block addressable non-volatile memory 108 and/or in persistent memory 106 in the solid state drive 102 may be issued by one or more applications 116 (programs that perform a particular task or set of tasks) through the storage stack 124 in the operating system 142 to the solid state drive controller circuitry 104.

The solid state drive controller circuitry 104 in the solid state drive 102 queues and processes commands (for example, read, write ("program"), erase commands) also referred to as Input/Output (I/O) commands received from the host circuitry 112 to perform an operation in the block addressable non-volatile memory 108 and/or persistent memory 106. Commands received by the solid state drive controller circuitry 104 from the host solid state drive interface circuitry 118 can be referred to as Host I/O commands.

Figure 2:
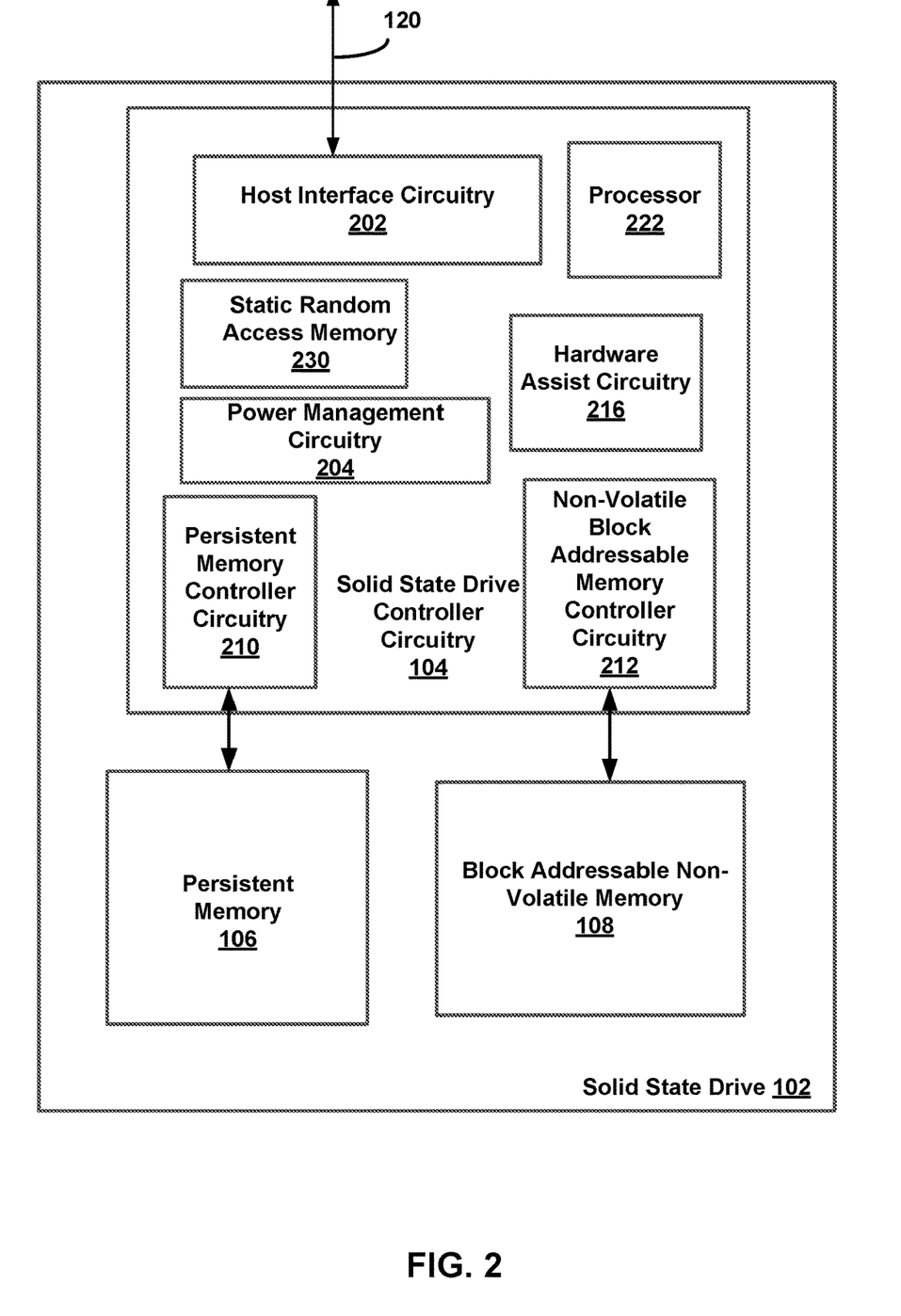
FIG. 2 is a block diagram of an embodiment of the solid state drive in FIG. 1.

FIG. 2 is a block diagram of an embodiment of the solid state drive 102 in FIG. 1. The solid state drive controller circuitry 104 in the solid state drive 102 includes host interface circuitry 202, persistent memory controller circuitry 210, non-volatile block addressable memory controller circuitry 212, a processor 222, hardware assist circuitry 216, Static Random Access Memory 230 and Power Management Circuitry 204. The Solid State drive controller circuitry 104 can be included in a Field Programmable Gate Array (FPGA) or an Application Specific Integrated Circuit (ASIC).

A portion of the static random access memory 230 can be allocated as a Logical-to-Physical (L2P) indirection table cache. Static Random Access memory (SRAM) is a volatile memory. Volatile memory is memory whose state (and therefore the data stored in it) is indeterminate if power is interrupted to the device. SRAM is a type of volatile memory that uses latching circuitry to store each bit. SRAM is typically used as a cache memory because in contrast to Dynamic Random Access Memory (DRAM) the data stored in SRAM does not need to be periodically refreshed.

Both persistent memory 106 and block addressable non-volatile memory 108 are non-volatile memory. A non-volatile memory (NVM) device is a memory whose state is determinate even if power is interrupted to the device. In one embodiment, the Block Addressable non-volatile memory 108 is a NAND Flash memory, or more specifically, multi-threshold level NAND flash memory (for example, Single-Level Cell ("SLC"), Multi-Level Cell ("MLC"), Tri-Level Cell ("TLC"), Quad-Level Cell ("QLC"), Penta-Level Cell ("PLC") or some other NAND Flash memory).

The block addressable non-volatile memory 108 includes at least one non-volatile memory die, for example a NAND Flash die. Typically, data is written (striped) across many NAND Flash die in the solid state drive 102 to optimize the write bandwidth to the block addressable non-volatile memory 108. The non-volatile memory on the non-volatile memory die includes a plurality of blocks, with each block including a plurality of pages. Each page in the plurality of pages to store data and associated metadata. In an embodiment, the non-volatile memory die has 2048 blocks, each block has 64 pages, and each page can store 2048 bytes of data and 64 bytes of metadata.

Persistent Memory 106 is a byte addressable write-in-place non-volatile memory. One example of byte addressable write-in-place non-volatile memory devices is a three-dimensional (3D) cross-point memory (3D XPoint) (also called persistent memory (PMEM)) a byte-addressable, write-in-place non-volatile memory (NVM) technology commercially available from Intel® Corporation as an Optane™, which may be packaged in a Data Center Persistent Memory Module (DCPMM). Other examples include single or multi-level Phase Change Memory (PCM) or phase change memory with a switch (PCMS), non-volatile memory devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

The hardware assist circuitry 216 manages data transfer between the persistent memory 106 and the block addressable non-volatile memory 108.

The Non-Volatile Block Addressable Memory Controller Circuitry 212 in the solid state drive controller circuitry 104 queues and processes commands (for example, read, write ("program"), erase commands) for the block addressable non-volatile memory 108. The Persistent Memory Controller Circuitry 212 in the solid state drive controller circuitry 104 queues and processes commands (for example, read, write commands) for the persistent memory 106.

Figure 3:
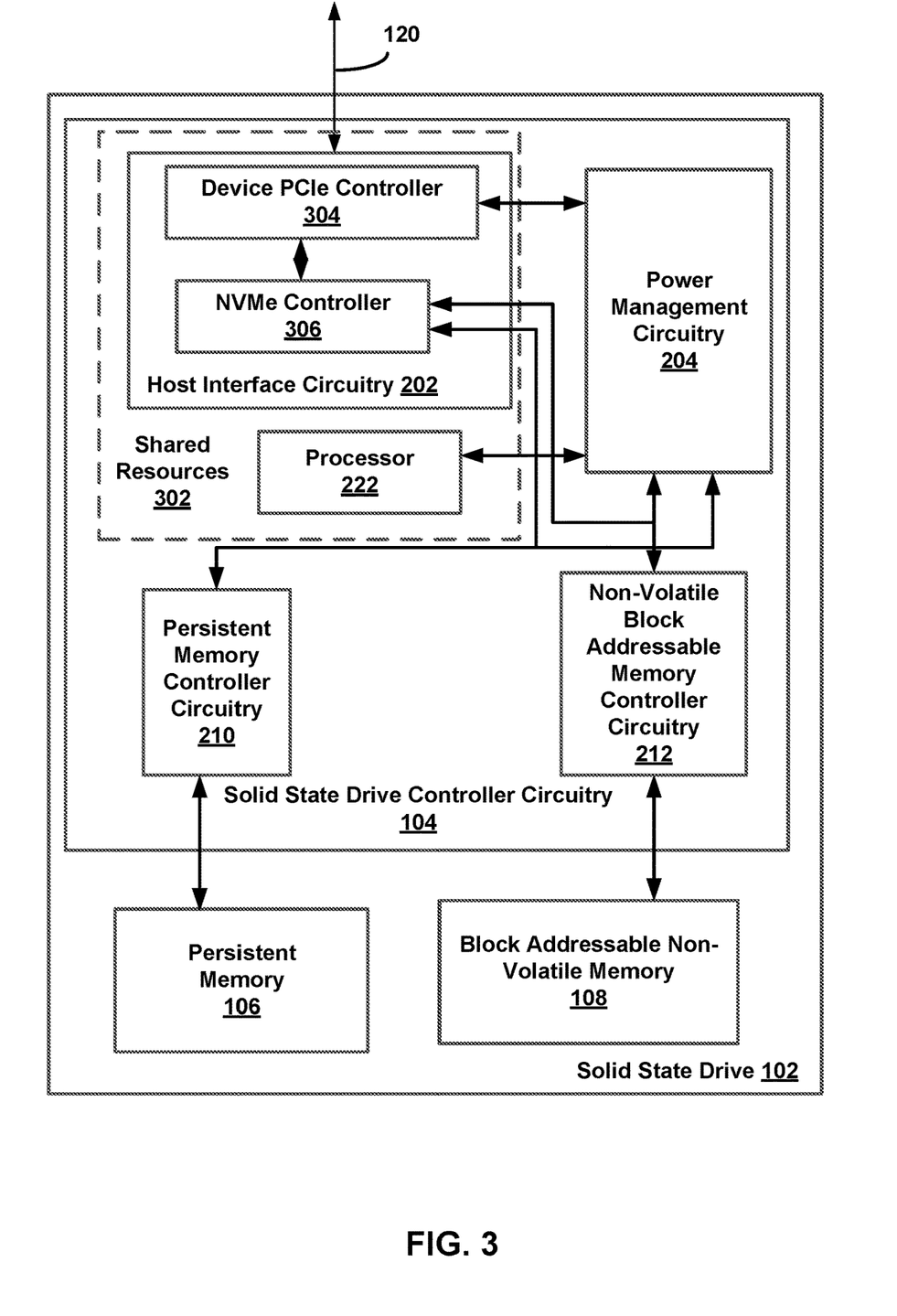
FIG. 3 is a block diagram of the solid state drive in FIG. 1 illustrating shared resources used by the power management circuitry to manage active and idle periods across the components in the solid-state drive to scale power with performance.

FIG. 3 is a block diagram of the solid state drive 102 in FIG. 1 illustrating shared resources 302 used by the power management circuitry 204 to manage active and idle periods across the components in the solid state drive 102 to scale power with performance.

The shared resources 302 are used by the power management circuitry 204, the persistent memory circuitry 210 and the non-volatile block addressable memory controller circuitry 212. The shared resources 302 include a processor 222, a device PCIe controller 304 and an NVMe controller 306 in the host interface circuitry 202 to communicate with the host circuitry 112 over the PCIe bus 120 using the NVMe standard protocol.

The power management circuitry 204 (also referred to as a power governor) monitors the power consumed by various components in the solid state drive 102 by monitoring activity on the plurality of media channels. The power management circuitry 204 can also actively move power budget from one component to another in the solid state drive 102 until a threshold of cumulative activity has been reached or exceeded, dependent on the current activity through different components.

Once the threshold of cumulative activity has been reached, the power management circuitry 204 can send a message over the PCIe bus 120 using the NVMe standard protocol to the host circuitry 112 to transition power state. The message can be an Asynchronous Notification Event followed by an interrupt to the host NVMe driver 110.

In response to the message, the host circuitry 112 limits the number of pending Host I/O commands. The Host I/O commands are limited so that the solid state drive 102 is in a non-operational power state (idle power state) quickly but enough to keep the solid state drive 102 efficiently busy when sufficient power budget has reaccumulated and the solid state drive 102 transitions to operational power state (active power state).

The power management circuitry 204 manages activity (for example, read and write operations) on two media channels (segments), a persistent memory media channel including persistent memory controller circuitry 210 and persistent memory 106 and a non-volatile block addressable memory media channel including non-volatile block addressable memory controller circuitry 212 and block addressable non-volatile memory 108.

Figure 4:
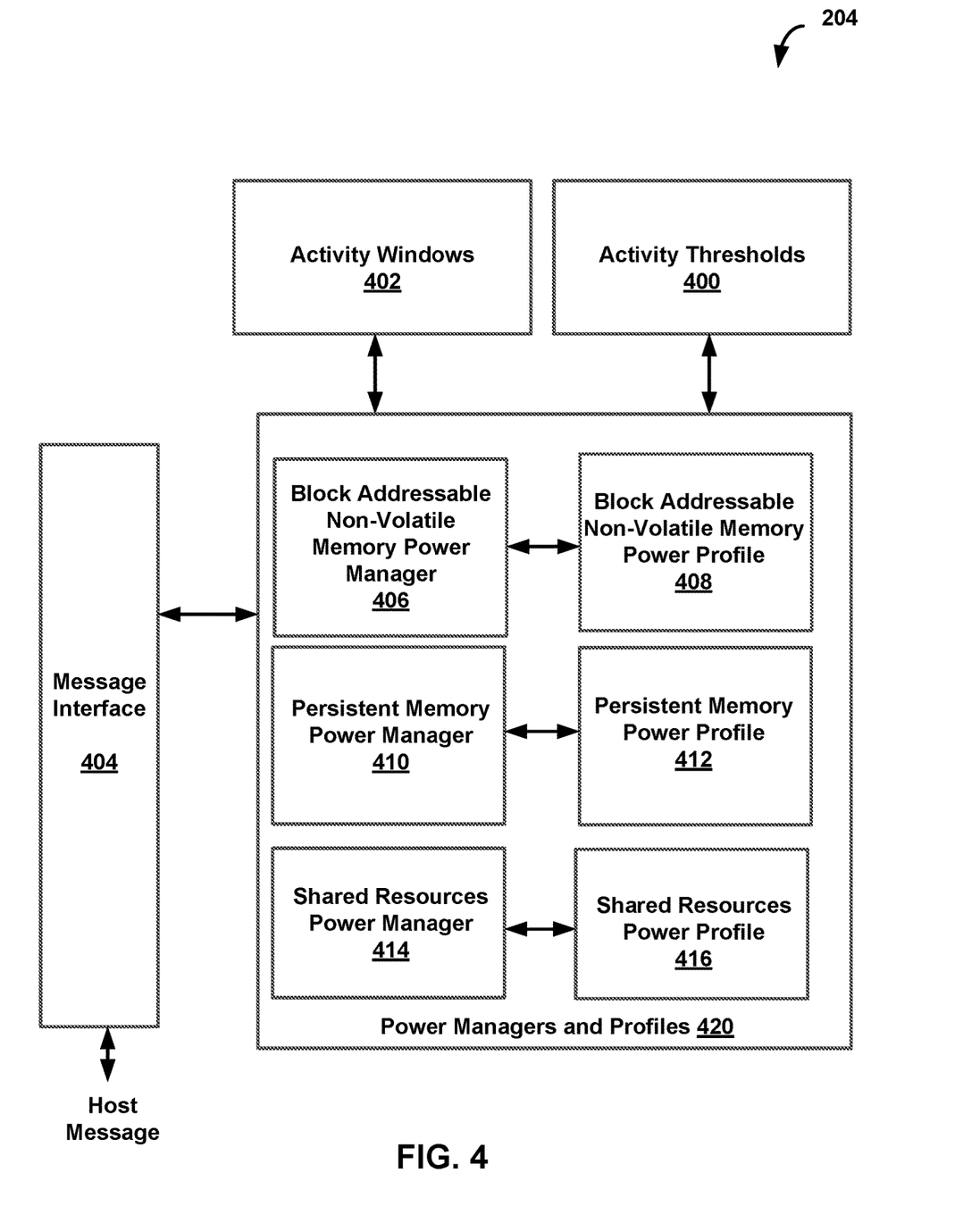
FIG. 4 is a block diagram of the power management circuitry shown in FIG. 3.

FIG. 4 is a block diagram of the power management circuitry 204 shown in FIG. 3. The power management circuitry 204 includes power managers and a power profiles 420 for components in the solid state drive 102. The power managers and power profiles 420 allow management of operations (for example, read and write operations to memories 106, 108 in the solid state drive 102) to be distributed to obtain an optimal power and thermal profile in the solid state drive 102.

The power managers and power profiles 420 include power managers and power profiles for shared resources 302, persistent memory 106 and block addressable non-volatile memory 108. The power profiles store static values for power consumption. The managers monitor the available power budget and track power consumed. A shared resources power profile 416 stores parameters for shared resources 302 for the pipeline used by the shared resources power manager 414.

A block addressable non-volatile memory power profile 408 stores power consumption for operations directed to block addressable non-volatile memory 108 in the solid state drive 102. For example, power consumption for a read cycle and a write cycle. A block addressable non-volatile memory power manager 406 monitors and controls power consumption for operations directed to block addressable non-volatile memory 108 in the solid state drive 102 using profiles stored in the block addressable non-volatile memory power profile 408.

A persistent memory power profile 412 stores power consumption for operations directed to persistent memory 106 in the solid state drive 102. For example, power consumption for a read cycle and a write cycle to persistent memory 106. A persistent memory power manager 410 monitors and controls power consumption for operations directed to persistent memory 106 in the solid state drive 102 using profiles stored in the persistent memory power profile 412.

The power management circuitry 204 manages activity (for example, read and write operations) on the two media channels (segments) through the use of power/bandwidth credits per media channel. Power/bandwidth credits are consumed when the media channel is performing transactions (for example, read/write operations to memory) and are accumulated while the media channel is idle.

Activity is managed via communication paths between the power management circuitry 204 and the other components (device PCIe controller 304, NVMe controller 306, processor 222, persistent memory controller circuitry 210, non-volatile block addressable memory controller circuitry 212, persistent memory 106 and block addressable non-volatile memory 108) in the solid state drive 102.

The activity windows 402 and activity thresholds 400 in the power management circuitry 204 are parameters that are used to establish the performance and power targets for the respective pipelines that include the two media channels. Each media channel is assigned credit thresholds for performance throttling. Performance throttling is a mechanism to regulate power being consumed in the solid state drive 102. Power consumption can be decreased by reducing the performance of the solid state drive 102.

Activity thresholds 400 in the power management circuitry 204 allow for bandwidth distribution to be modulated between the two media channels and also allows performance per unit of power to be normalized across the two media channels. Power consumption can be normalized by allocating power/bandwidth credits based on the media type (for example, persistent memory 106 or block addressable non-volatile memory 108).

Credits are assigned to a media channel based on type of memory in the media channel. A first credit threshold can be assigned to engage performance throttling and a second credit threshold can be assigned to disengage performance throttling. Each media channel is assigned credit consumption values including a credit consumption increment value for a type of transaction (for example, read or write) and a credit consumption decrement value (or accumulation value) while the media channel is idle. Each media channel also has throttle settings that define the command idleness duration for the media channel, for example, an idle time during which commands are not sent to the media channel.

The block addressable non-volatile memory power profile 408 and the persistent memory power profile 412 allow for different credit values to be assigned to different transaction types to normalize power consumption across the two media channels. For example, if a write to persistent memory 106 consumes twice the power of a write to the block addressable non-volatile memory 108, the value assigned for credits consumed for the write to persistent memory 106 stored in the persistent memory power profile 412 is twice the value assigned for credits consumed by the write to the block addressable non-volatile memory 108 stored in the block addressable non-volatile memory power profile 408.

The active time (active window) during which commands are sent by the NVMe controller 306 to the media channels and the idle time (idle window) during which commands are not sent by the NVMe controller 306 to the media channels are dependent on the credits and throttle settings.

A message interface 404 allows messages (for example, an Asynchronous Notification Event) to be passed between the power management circuitry 204 and the host NVMe driver 110. A message can be an explicit message (for example, an interrupt) from the power management circuitry 204 or could be implied through events. For example, a message can be sent by the power management circuitry 204 to the host interface circuitry 202 to notify the host NVMe driver 110 of a temperature threshold crossing event.

Figure 5:
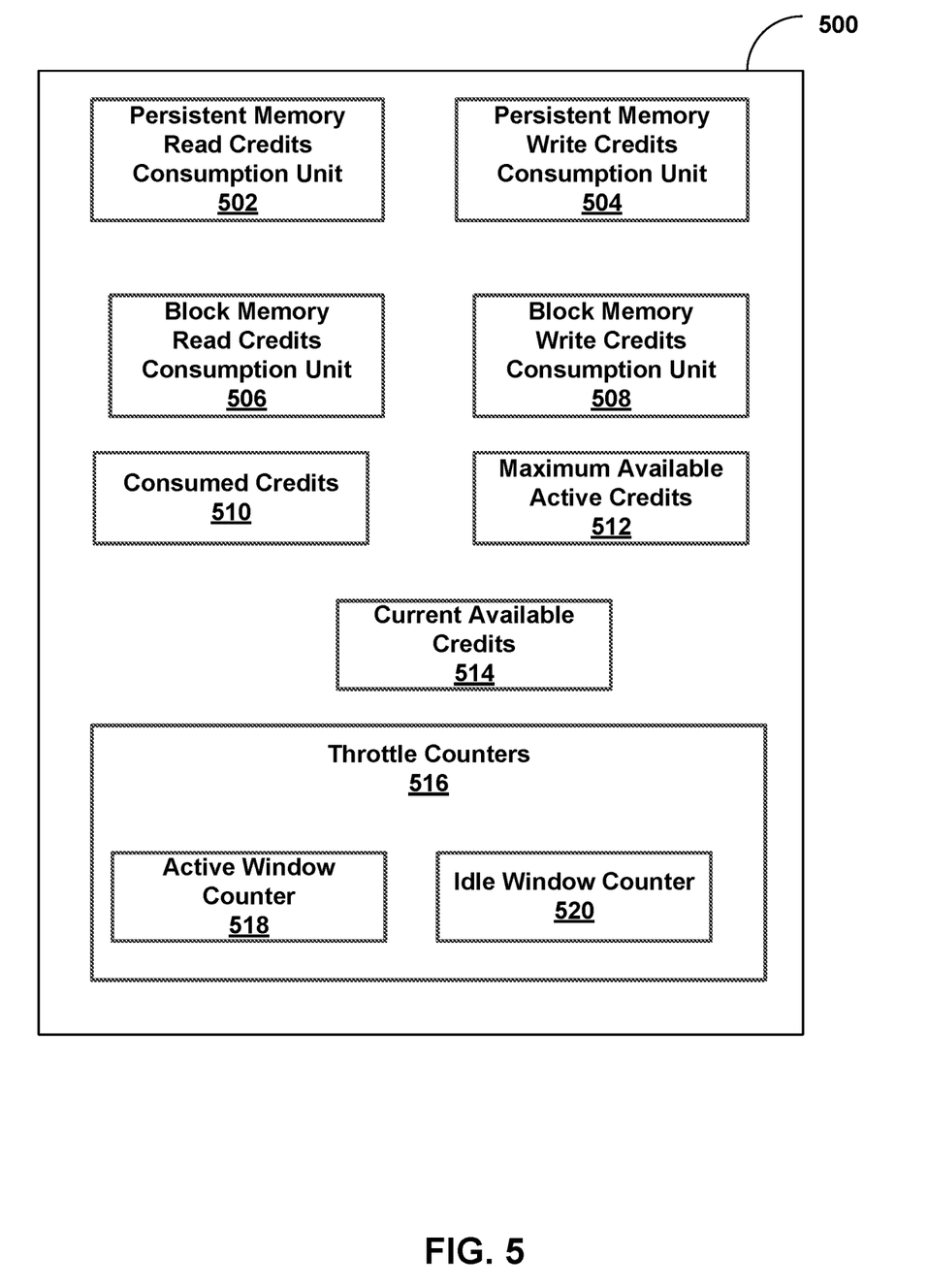
FIG. 5 is a block diagram illustrating credits used in the power management circuitry to monitor and control power consumption for operations in the media channels in the solid state drive.

FIG. 5 is a block diagram illustrating credits 500 used in the power management circuitry 204 to monitor and control power consumption for operations in the media channels in the solid state drive 102.

The credits 500 in the block addressable non-volatile memory power profile 408, persistent memory power profile 412 and shared resources power profile 416 are consumed as commands are sent to the media channels and are accumulated when the media channels are idle.

The persistent memory read credits consumption unit 502 stores a value representing the number of credits consumed by a read command sent to the persistent memory media channel (persistent memory controller circuitry 210 and persistent memory 106).

The persistent memory write credits consumption unit 504 stores a value representing the number of credits consumed by a write command sent to the persistent memory media channel (persistent memory controller circuitry 210 and persistent memory 106).

The block memory write credits consumption unit 506 stores a value representing the number of credits consumed by a read command sent to the non-volatile block addressable memory media channel (non-block addressable memory controller circuitry 212 and block addressable non-volatile memory 108).

The block memory write credits consumption unit 508 stores a value representing the number of credits consumed by a write command sent to the non-volatile block addressable memory media channel (non-block addressable memory controller circuitry 212 and block addressable non-volatile memory 108).

The consumed credits 510 stores a sum of the credits being consumed as transactions flow to the persistent memory media channel and non-volatile block addressable memory channel.

The maximum available active credits 512 stores a value representing the number of active credits permitted for both of the memory media channels.

The current available credits 514 stores a value representing the number of available credits which is dependent on the maximum available active credits 512 and the consumed credits 510.

The throttle counters 516 include an active window counter 518 (also referred to as an active window timer) and an idle window counter 520 (also referred to as an idle window timer). The active window counter 518 is a counter that is mostly free running and counts a programmable window of time during which the power management controller 204 permits the media channels to perform transactions (for example, read/write operations to persistent memory 106 and block addressable non-volatile memory 108). In an embodiment, the active window counter 518 is decremented and is set to an initial value in response to a power state transition command received from the host circuitry 112 and when the idle window timer expires. In another embodiment, the active window counter 518 can be initialized to zero and incremented.

When the count in the active window counter 518 reaches the programmed window of time (which can also be referred to as the expiration of the active window timer), the active window counter 518 is disabled and the idle window counter 520 is enabled. While the idle window counter 520 is enabled, the media channels cannot perform transactions. The idle window counter (also referred to as an idle window timer) 520 can also start once all the available credits are consumed. The idle window counter 520 starts when either the Active Window Counter 518 expires or all available credits are consumed, whichever of the two events happens first.

The credits for the memory channels (the persistent memory read credits consumption unit 502, the persistent memory write credits consumption unit 504, the block memory write credits consumption unit 506 and the block memory write credits consumption unit 508) allow each media channel to have its own power target so that the bandwidth of each media channel can be managed separately based on the power budget for the solid state drive 102.

Per media channel capabilities allow for bandwidth distribution to be modulated to favor one media channel over another and also allow the capability to normalize performance per unit of power across different media channels. In an embodiment, each media channel has one or more of a credit threshold at which performance throttling is engaged, a credit threshold at which performance throttling is disengaged, credit consumption increment values for different types of commands (for example, read command and write command), a credit consumption decrement value (or accumulation value) for idle periods and a throttle setting for command idleness duration for the media channel.

A mechanism is provided in the power management circuitry 204 to transfer credits from one media channel to the other media channel while one media channel is running out of credits while the other media channel has credits. This allows for performance maximization in the active window by dynamic migration of power credits from a lightly used media channel to a heavily used media channel while ensuring that the total power budget is within a defined budget.

Figure 6:
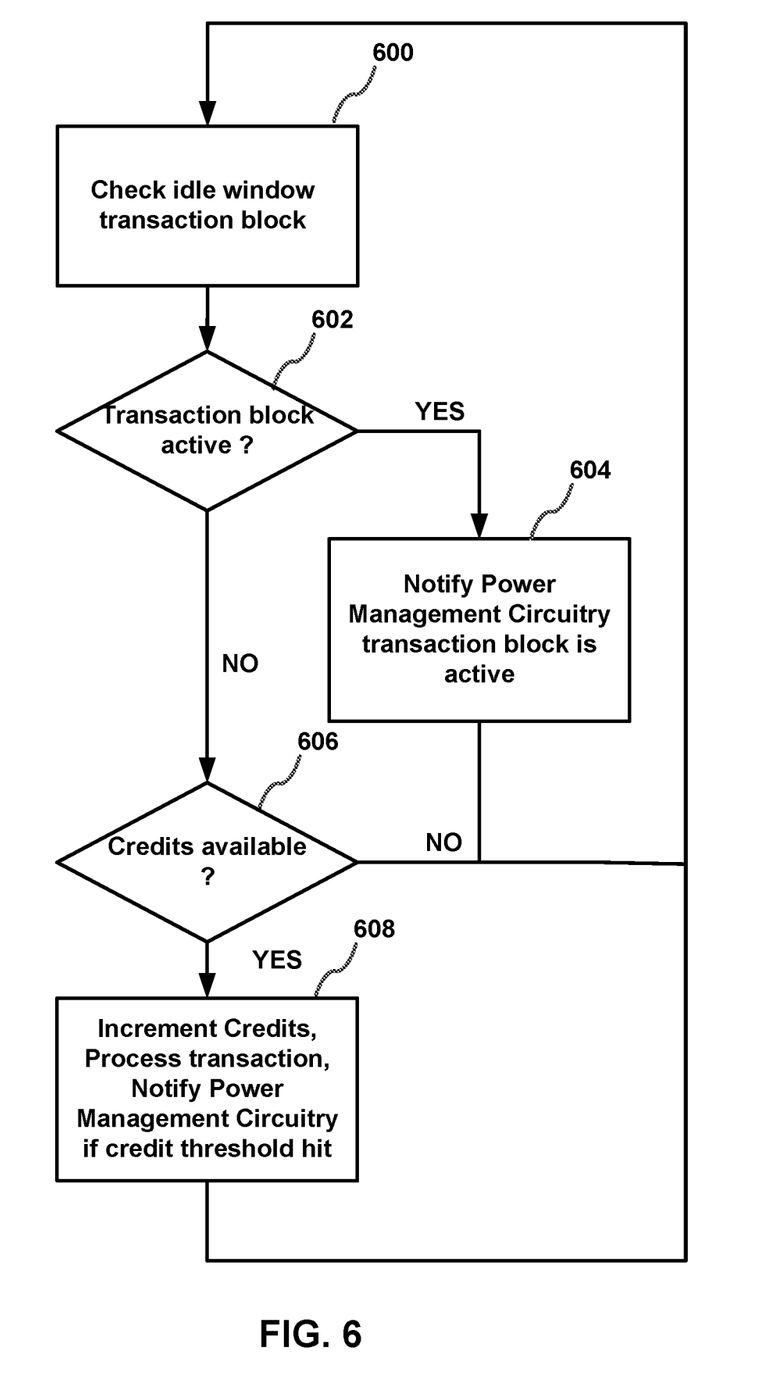
FIG. 6 is a flow graph illustrating command handler transaction credit checks performed in the host interface circuitry.

FIG. 6 is a flow graph illustrating command handler transaction credit checks performed in the host interface circuitry 202. For each command received from the host circuitry 112, the host interface circuitry 202 checks the active window counter 518 and current available credits 514 prior to forwarding the command to one of the media channels. The power management circuitry 204 can enter an idle period (idle window is active) upon detection of a thermal event (for example, temperature increasing beyond a programmed value) and while available credits 514 are less than a minimum threshold. The solid state drive controller circuitry 104 to send a notification to the host system (host circuitry 112) at start of the idle period to stop scheduling commands and to send another notification to the host system at end of the idle period to resume scheduling commands At block 600, check if transaction (command) processing is enabled or disabled (blocked). If idle window is active (idle period), transactions are blocked (transaction block is active) and processing continues with block 602. If a Transaction Block is active, power management circuitry 204 is blocking processing of transactions, the command pipelines wait for the block to be removed before starting to process a new transaction.

At block 602, if the transaction block is active, processing continues with block 604. If not, processing continues with block 606. The transaction (command) block status (active/non-active) is based on the values of the credits 500 or the status of the active window counter 518. The transaction block status indicates whether the command is to be forwarded to one of the media channels. The command is not forwarded to one of the media channels based on the status of the active window (inactive) or based on the credits 500 (the consumed credits 510 is greater than or equal to the current available credits 514).

At block 604, the host interface circuitry notifies the power management circuitry 204 that the transaction block is active. The notification is sent as a host message to the message interface 404 in the power management circuitry 204. While the transaction block is active, commands cannot be forwarded to the media channels. Processing continues with block 600 to continue to check for idle window transaction block.

At block 606, if there are available credits 514, processing continues with block 608. If not, processing continues with block 600 to continue to check the idle window transaction block.

At block 608, the command is forwarded to the media channel. The consumed credits 510 are incremented and the power management circuitry 204 is notified if the number of credits consumed (consumed credits 510) exceeds a credit threshold stored in power managers and power profiles 420 or a thermal event (for example, temperature increasing beyond a programmed value) has been detected. The power management circuitry 204 engages the throttling policy (by activating the idle window counter 520) to slow down the processing of commands. Processing continues with block 600 to process another command.

Figure 7:
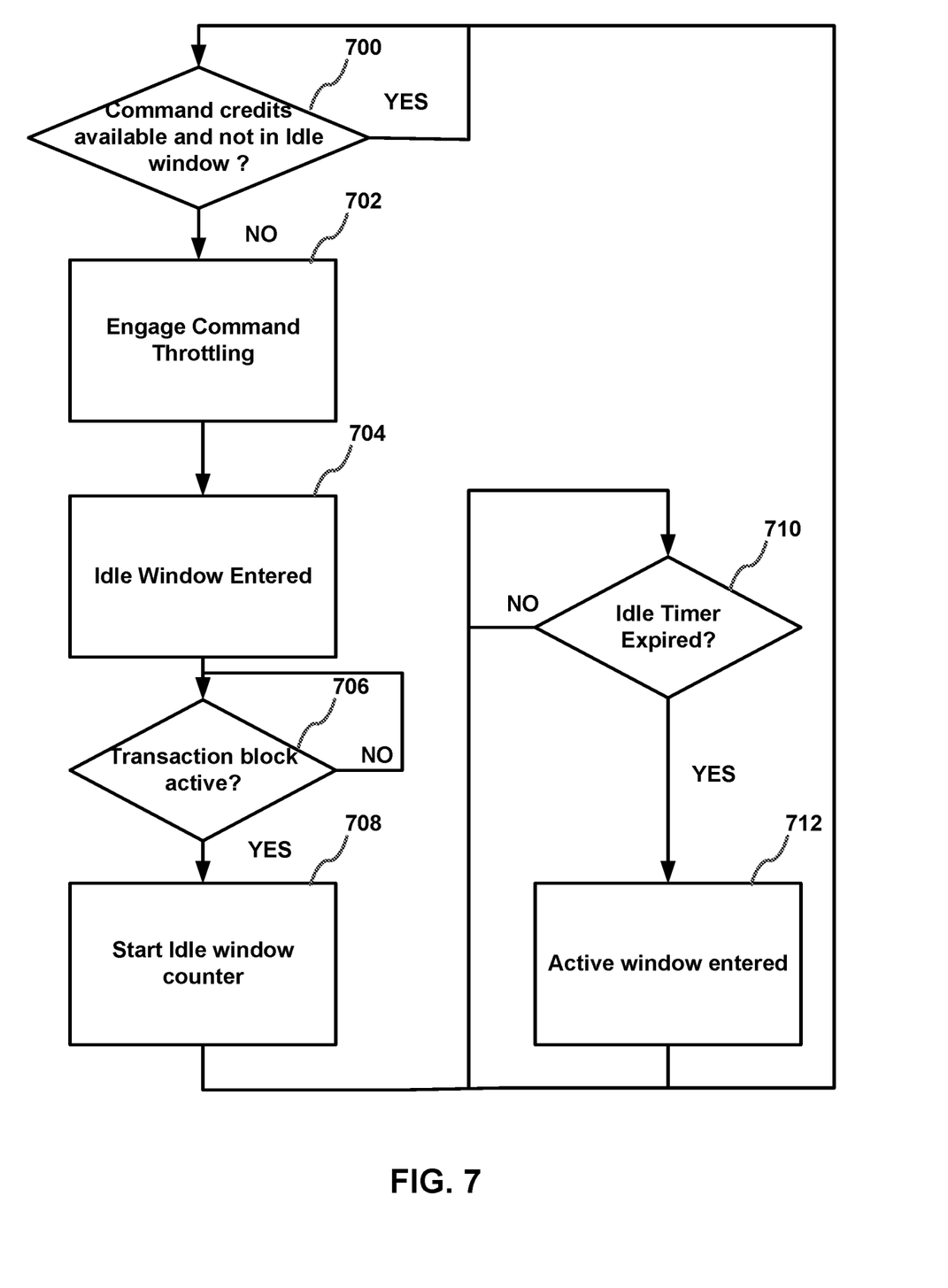
FIG. 7 is a flow graph illustrating power management operations performed in the power management circuitry to manage the power budget for the solid state drive.

FIG. 7 is a flow graph illustrating power management operations performed in the power management circuitry 204 to manage the power budget for the solid state drive 102.

At block 700, if credits are available based on the value stored in current available credits 514 and idle window is not active, processing continues with block 700 to continue to monitor the current available credits 514 and idle window. If not, processing continues with block 702.

At block 702, credits are not available and idle window is active, command suppression to prevent processing of commands is to be performed. Processing continues with block 704.

At block 704, the power management circuitry 204 and Host Interface Circuitry 202 enters command suppression state in which processing of commands is suppressed (prevented). The idle window is the minimum idle time enforced by the NVMe controller 306 after entering the command suppression state before another command can be forwarded to the media channels. Idle window is a time period during which the power management circuitry 204 does not allow commands to be sent to the media channels until a low watermark is achieved on consumed credits or idle window expires.

At block 706, if the power management circuitry 204 and Host Interface Circuitry 202 has entered command suppression state (transaction block is in place), processing continues with block 708. If not, processing continues with block 704 until the command suppression state is entered.

At block 708, the idle window counter 520 is enabled at the start of the idle window period. Processing continues with block 710.

At block 710, if the value in the active window counter 518 indicates that the idle window has expired, processing continues with block 712. If not, processing continues with block 710 until the idle timer has expired.

At block 712, the idle timer has expired. The active window counter 518 is enabled by the power management circuitry 204 at the start of the active window period. Processing continues with block 700.

The use of credits 500 allows the components in the path (pipeline) from the Host Solid State Drive Interface Circuitry 202 to the memory 108, 106 in the solid state drive 102 including physical interfaces (for example, high-speed serial computer expansion bus 120) to switch to a low power state. This allows all of the circuitry (components) in the pipeline between the host NVMe driver 110 in the host circuitry 112 and the memory 108, 106 in the solid state drive 102 to switch to the low power state and achieve the lowest power/thermal state to maximize the idle window period.

An embodiment has been described for a solid state drive with one power management circuitry 204. In other embodiments, there can be more than one power management circuitry 204. For example, a first power management circuitry 204 to manage the persistent memory, a second power management circuitry 204 to manage the block addressable non-volatile memory and a third power management circuitry 204 to manage credit transfers between the first power management circuitry 204 and the second power management circuitry 204 and to manage the shared resources 302. The third power management circuitry 204 is also responsible for message transfers on the message interface 404 between the host interface circuitry 202 and the first power management circuitry 204 and the second power management circuitry 204.

To obtain an optimal power and thermal profile, a mechanism to coordinate active and idle periods across all agents in a workload pipeline for a given performance target is provided. The mechanism provides best performance for a given power and thermal profile.

The power management circuitry 204 to coordinate active and idle periods across the media channels in the solid state drive 102 improves battery life of a computer system 100 that includes the solid state drive 102. The power management circuitry 204 also reduces the cost of the computer system 100 by minimizing the need for thermal dissipation, for example, via air flow or heat sinks. In addition, the use of throttling by the power management circuitry 204 improves performance of applications for various workloads and thus results improves user experience.

An embodiment has been described for a solid state drive in a computer system. The power management circuitry 204 is not limited to use in a solid state drive. The power management circuitry 204 can be used to coordinate active and idle periods across all agents in any device that includes a pipeline to process workloads.

Figure 8:
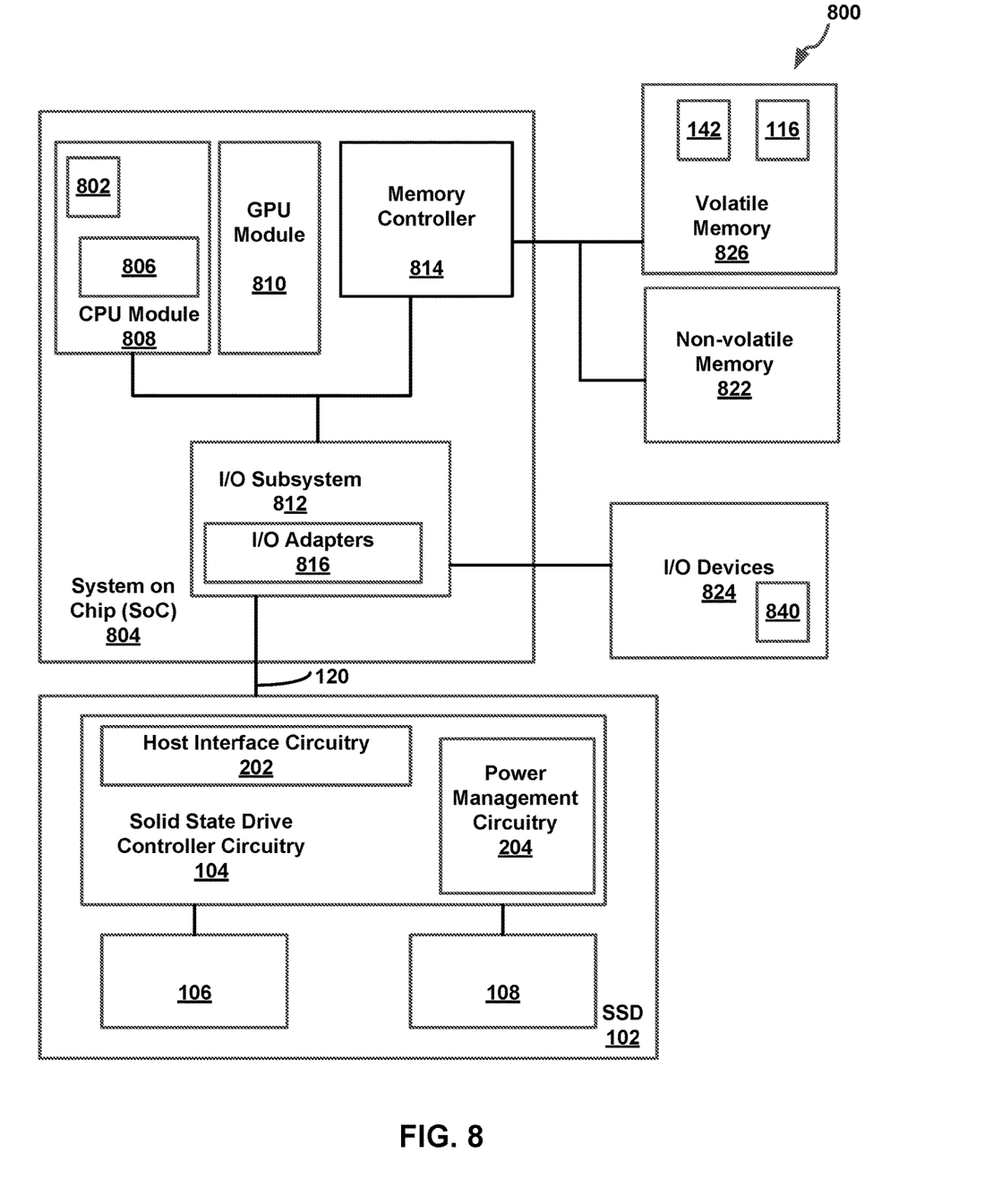
FIG. 8 is a block diagram of an embodiment of a computer system that includes a solid state drive that includes the power management circuitry.

FIG. 8 is a block diagram of an embodiment of a computer system 800 that that includes the power management circuitry 204 in solid state drive 102 to manage the power budget of the solid state drive 102. Computer system 800 can correspond to a computing device including, but not limited to, a server, a workstation computer, a desktop computer, a laptop computer, and/or a tablet computer.

The computer system 800 includes a system on chip (SOC or SoC) 804 which combines processor, graphics, memory, and Input/Output (I/O) control logic into one SoC package. The SoC 804 includes at least one Central Processing Unit (CPU) module 808, a volatile memory controller 814, and a Graphics Processor Unit (GPU) 810. In other embodiments, the volatile memory controller 814 can be external to the SoC 804. The CPU module 808 includes at least one processor core 802, and a level 2 (L2) cache 806.

Although not shown, each of the processor core(s) 802 can internally include one or more instruction/data caches, execution units, prefetch buffers, instruction queues, branch address calculation units, instruction decoders, floating point units, retirement units, etc. The CPU module 808 can correspond to a single core or a multi-core general purpose processor, such as those provided by Intel® Corporation, according to one embodiment.

The Graphics Processor Unit (GPU) 810 can include one or more GPU cores and a GPU cache which can store graphics related data for the GPU core. The GPU core can internally include one or more execution units and one or more instruction and data caches. Additionally, the Graphics Processor Unit (GPU) 810 can contain other graphics logic units that are not shown in FIG. 8, such as one or more vertex processing units, rasterization units, media processing units, and codecs.

Within the I/O subsystem 812, one or more I/O adapter(s) 816 are present to translate a host communication protocol utilized within the processor core(s) 802 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 816 can communicate with external I/O devices 824 which can include, for example, user interface device(s) including a display and/or a touch-screen display 840, printer, keypad, keyboard, communication logic, wired and/or wireless, storage device(s) including hard disk drives ("HDD"), solid-state drives ("SSD"), removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)).

The I/O adapters 816 can include a Peripheral Component Interconnect Express (PCIe) adapter that is communicatively coupled using the NVMe (NVM Express) over PCIe (Peripheral Component Interconnect Express) protocol over bus 120 to host interface circuitry 202 in the solid state drive 102 as discussed in conjunction with FIG. 1.

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

The volatile memory 826 can include the operating system 142 and applications 116 discussed in conjunction with FIG. 1. A non-volatile memory 822 is communicatively coupled to the SoC 804.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. A solid state drive comprising:
controller circuitry to receive a command to perform an operation in the solid state drive from a host system communicatively coupled to the solid state drive;
a plurality of media channels, each media channel including a type of memory and a memory controller, the plurality of media channels including a block addressable non-volatile memory channel and a byte addressable write-in-place non-volatile media channel, the block addressable non-volatile memory channel including a block addressable non-volatile type of memory, the byte addressable write-in-place non-volatile media channel including a byte addressable write-in-place non-volatile type of memory; and
power management circuitry to monitor activity on the plurality of media channels to coordinate an active period and an idle period, using credits assigned to each of the plurality of media channels based on the type of memory included in each media channel, to manage a power budget for the solid state drive to perform the operation.

2. The solid state drive of claim 1, wherein based on the activity on the plurality of media channels, the power management circuitry to move the power budget assigned to one of the plurality of media channels to another one of the plurality of media channels.

3. The solid state drive of claim 1, wherein the controller circuitry to send a notification to the host system at start of the idle period to stop scheduling commands and to send another notification to the host system at end of the idle period to resume scheduling commands.

4. The solid state drive of claim 1, wherein power is not provided to the plurality of media channels and the controller circuitry during the idle period.

5. The solid state drive of claim 1, wherein the credits include available credits, the power management circuitry to enter the idle period while the available credits are less than a minimum threshold.

6. The solid state drive of claim 1, wherein the power management circuitry to enter the idle period upon detection of a thermal event.

7. A method comprising:
receiving a command to perform an operation in a solid state drive from a host system communicatively coupled to the solid state drive;
monitoring activity on a plurality of media channels in the solid state drive, each media channel including a type of memory and a memory controller, the plurality of media channels including a block addressable non-volatile memory channel and a byte addressable write-in-place non-volatile media channel, the block addressable non-volatile memory channel including a block addressable non-volatile type of memory, the byte addressable write-in-place non-volatile media channel including a byte addressable write-in-place non-volatile type of memory; and
using credits assigned to each of the plurality of media channels based on the type of memory included in each media channel to coordinate an active period and an idle period to manage a power budget for the solid state drive to perform the operation.

8. The method of claim 7, further comprising:
moving the power budget assigned to one of the plurality of media channels to another one of the plurality of media channels based on the activity on the plurality of media channels.

9. The method of claim 7, further comprising:
sending a notification to the host system at start of the idle period to stop scheduling commands; and
sending another notification to the host system at end of the idle period to resume scheduling commands.

10. The method of claim 7, wherein power is not provided to the plurality of media channels during the idle period.

11. The method of claim 7, further comprising:
entering the idle period while available credits are less than a minimum threshold.

12. The method of claim 7, further comprising:
entering the idle period upon detection of a thermal event.

13. A system comprising:
a processor;
a solid state drive communicatively coupled the processor, the solid state drive comprising:
controller circuitry to receive a command to perform an operation in the solid state drive from a host system communicatively coupled to the solid state drive;
a plurality of media channels, each media channel including a type of memory and a memory controller, the plurality of media channels including a block addressable non-volatile memory channel and a byte addressable write-in-place non-volatile media channel, the block addressable non-volatile memory channel including a block addressable non-volatile type of memory, the byte addressable write-in-place non-volatile media channel including a byte addressable write-in-place non-volatile type of memory; and
power management circuitry to monitor activity on the plurality of media channels to coordinate an active period and an idle period using credits assigned to each of the plurality of media channels based on the type of memory included in each media channel, to manage a power budget for the solid state drive to perform the operation.

14. The system of claim 13, wherein based on the activity on the plurality of media channels, the power management circuitry to move the power budget assigned to one of the plurality of media channels to another one of the plurality of media channels.

15. The system of claim 13, wherein power is not provided to the plurality of media channels and the controller circuitry during the idle period.

16. The system of claim 13, wherein the credits include available credits, the power management circuitry to enter the idle period while the available credits are less than a minimum threshold.

17. The system of claim 13, wherein the power management circuitry to enter the idle period upon detection of a thermal event.

* * * * *